United States Patent [19]

Kuss

[11] 3,910,301

[45] Oct. 7, 1975

[54] ATTITUDE SENSITIVE FUEL VALVE

[75] Inventor: Ralph L. Kuss, Findlay, Ohio

[73] Assignee: R. L. Kuss & Co., Findlay, Ohio

[22] Filed: Apr. 8, 1974

[21] Appl. No.: 458,690

[52] U.S. Cl. .................... 137/38; 137/549; 180/104
[51] Int. Cl.² ............................................ F16K 17/36
[58] Field of Search ............ 137/38, 39, 43; 180/104

[56] References Cited
UNITED STATES PATENTS

| | | | |
|---|---|---|---|
| 2,619,185 | 11/1952 | Rudisill | 137/38 X |
| 2,676,708 | 4/1954 | Risk | 137/38 X |
| 2,942,612 | 6/1960 | Klank, Jr. | 137/43 |

*Primary Examiner*—Robert G. Nilson
*Attorney, Agent, or Firm*—Vincent L. Barker, Jr.; Thomas M. Freiburger

[57] ABSTRACT

A normally-open fluid shut-off valve responsive to rotation about one of its axes is disclosed. The device utilizes four separate ball-and-seat valves, each of which is oriented so that fluid pressure exerted on the seated ball tends to keep the ball seated. Rotation of the device in either direction about its axis effects the closure of two of the ball-and-seat valves, thereby stopping fluid flow through the device.

6 Claims, 5 Drawing Figures

U.S. Patent  Oct. 7, 1975  3,910,301
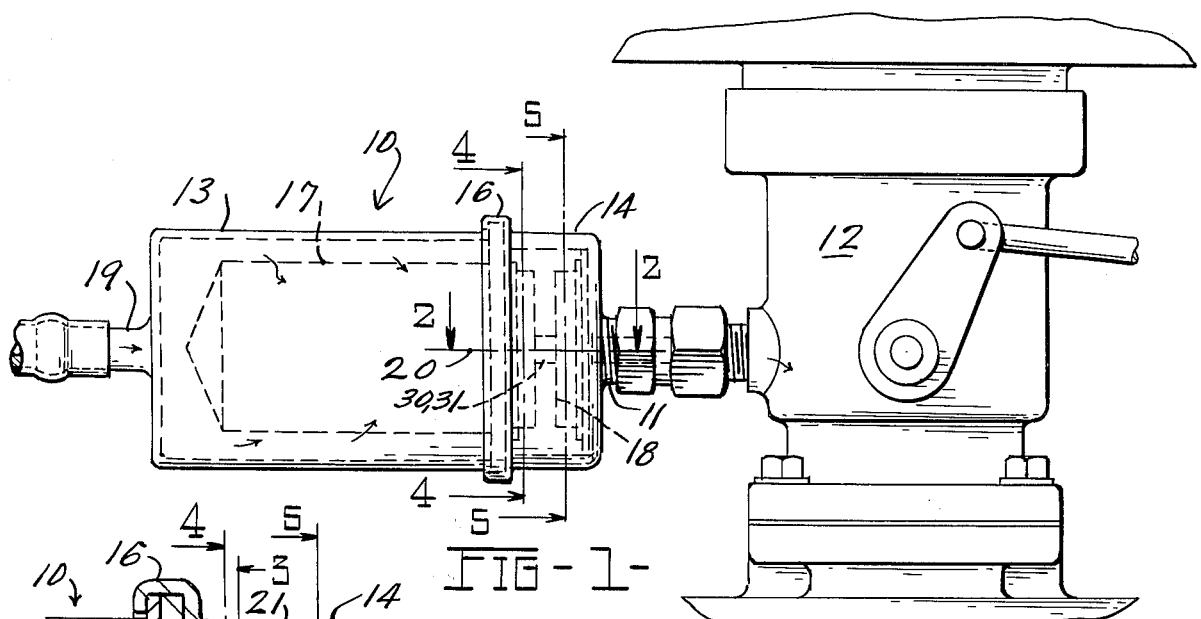
FIG-1-
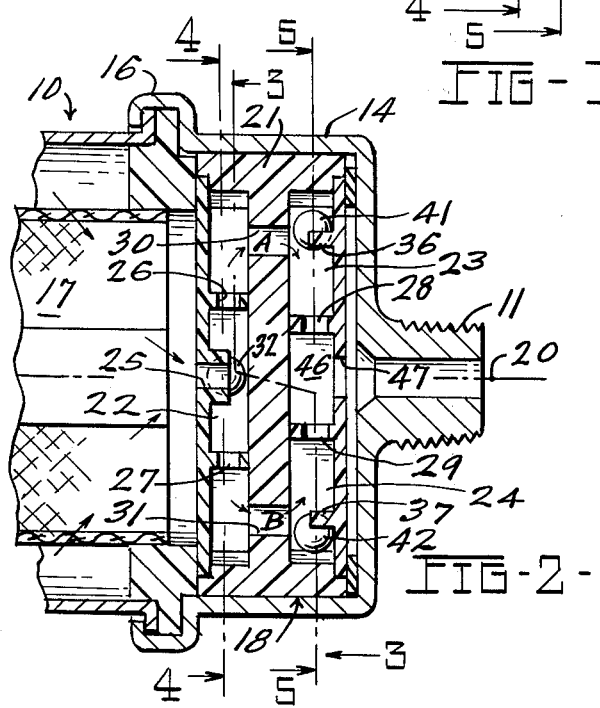
FIG-2-
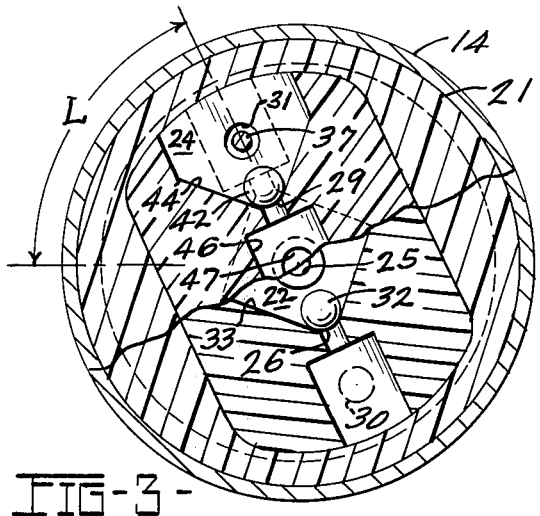
FIG-3-
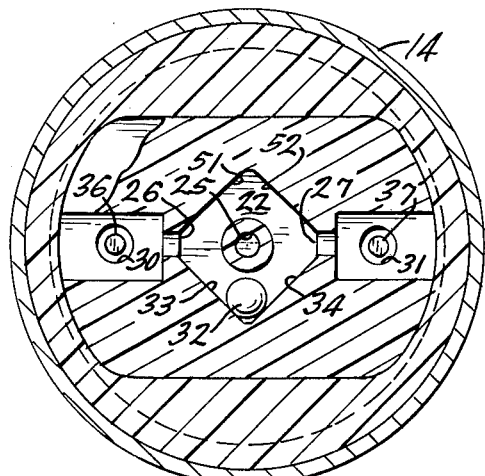
FIG-4-
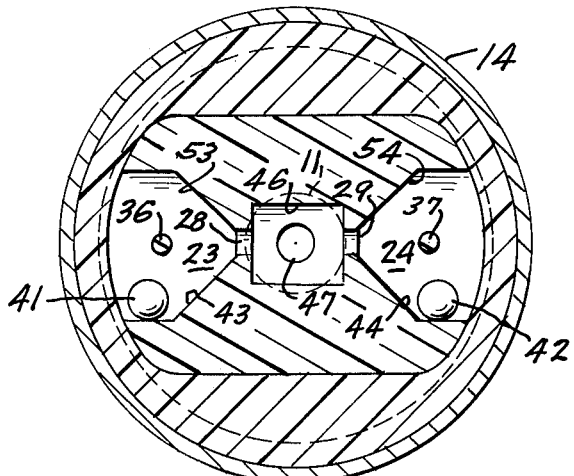
FIG-5-

ATTITUDE SENSITIVE FUEL VALVE

BACKGROUND OF THE INVENTION

The invention relates to fluid valves, and more particularly to an automotive fuel line valve effective to stop the flow of fuel during rollover or inversion of the vehicle in which it is incorporated.

Automotive fuel shut-off valves sensitive to changes in attitude of a vehicle, such as during rollover of the vehicle, are shown in U.S. Pat. Nos. 2,258,323, 2,619,185 and 2,676,708. Such devices are designed to be incorporated in the fuel line of a liquid-fuel operated automobile in order to cut off the flow of fuel through the line and into the engine in the event the vehicle is overturned, thus tending to minimize the possibility of fire from fuel leakage.

SUMMARY OF THE INVENTION

A roll-responsive fuel shut-off valve according to the present invention includes two valve chambers arranged in series and defining bifurcated parallel flow paths. The flow is bifurcated at the upstream end of the first chamber and rejoined at the downstream end of the second chamber. Each valve chamber includes two ball-and-seat type valves positioned within the respective parallel flow paths. A roll axis through the two chambers is aligned longitudinally when the device is incorporated in an automobile. In the normal upright position of the automobile, fuel flows into the first valve chamber where the flow is normally divided between two exit ports, each passing through a valve seat and leading to the second valve chamber. A single ball in the first valve chamber normally rests in a central position, retained there by outwardly diverging inclines. If the vehicle is rolled, however, one of the inclines becomes a decline and the ball rolls out to one of the outwardly positioned seats, stopping fuel flow through the seat and effectively cutting off one of the parallel flow paths.

The second valve chamber contains two balls as well as two seats. In normal upright position of the device, the two balls are held in respective outward rest positions, each lying at the bottom of a surface inclined toward the center. The seats are disposed centrally, and fuel flowing through them from the respective ports leading from the first valve chamber reaches a common outlet flow path. If the device encounters rotation about its roll axis as discussed above, one of the two balls in this second valve chamber will roll toward center and seat in its respective valve seat. The closing of this ball-and-seat valve shuts off the second fuel flow path, so that both parallel flow paths have been closed and fuel flow through the device is completely terminated. Roll in either direction, of course, will cause two balls to seat, thereby closing both flow passages.

The positioning of the ball-and-seat valves according to the invention allows them to be further urged against the seats by upstream fluid pressure. Once seated, the balls therefore tend to remain in their seats during further vehicle attitude changes.

The inclined surfaces over which the balls must roll to shut off fuel flow are sufficiently steep to prevent deployment of the device during sharp turns or skids, except those producing side forces considerably in excess of one G, which are generally not encountered except under accident conditions.

The shut-off valve of the invention may be incorporated within an in-line fuel filter, usually between the fuel pump and carburetor of an automobile. The first and second valve chambers each having a degree of symmetry that allows the device to be oriented in the vehicle in one of two 180°-opposed positions about the roll axis of the device.

BRIEF DESCRIPTION OF THE DRAWINGS

FIG. 1 is an elevational view of a fuel filter and a roll-responsive fuel valve according to the present invention, shown connected to the inlet of an automobile carburetor;

FIG. 2 is a sectional view taken along the line 2—2 of FIG. 1;

FIG. 3 is a stepped sectional view taken along the line 3—3 of FIG. 2 showing the valve closed during right or clockwise roll of the vehicle in which it is incorporated;

FIG. 4 is a sectional view taken along the line 4—4 of FIG. 1; and

FIG. 5 is a sectional view taken along the line 5—5 of FIG. 1.

DESCRIPTION OF THE PREFERRED EMBODIMENT

In the drawings, FIG. 1 shows an in-line type fuel filter 10 having a downstream fitting 11 connected into the forward end of a carburetor 12 of an automobile. The filter 10 includes a case body 13 and a case head 14 crimped together at 16 in such a way as to retain a mesh filter element 17 in place therein. In the case head 14 downstream of the filter element 17 is an attitude sensitive fuel valve 18. Fuel entering an inlet fitting 19 of the filter 10 first passes through the mesh element 17, then travels through the valve 18 and through the fitting 11 into the carburetor 12. The valve 18 is oriented with its roll axis 20 aligned in the longitudinal direction in the automobile.

FIG. 2 is a sectional plan view of the attitude sensitive fuel valve 18 within the filter case head 14. The device 18 includes a housing 21 defining a first fuel chamber 22 and secondary fuel chambers 23 and 24. Fuel entering an inlet 25 of the first chamber 22 is divided into two parallel flow paths, A and B. The term "parallel" as used to describe fluid flow paths herein and in the appended claims is intended to characterize multiple similar paths, as opposed to paths in series. The parallel paths are not necessarily parallel in the sense of physical alignment. Flow path A passes through a ball valve seat 26 in the first chamber 22, through a duct 30 into the secondary chamber 23, and through a seat 28 to exit the chamber 23. Similarly, flow path B passes through a seat 27, a duct 31 and another seat 29. When the fuel has passed through the seats 28 and 29, it is rejoined into one common flow path again as it enters the outlet fitting 11.

The chamber 22 contains a ball 32, best seen in FIG. 4, for the valve seats 26 and 27. The ball 32 normally rests at the converging lower ends of upwardly inclined surfaces 33 and 34. The ducts 30 and 31 are seen in FIG. 4 with studs 36 and 37 indicated in the secondary fuel chambers beyond. The studs 36 and 37 are better seen in FIGS. 2, 3 and 5.

FIG. 5 shows the structure of the secondary fuel chambers 23 and 24. Balls 41 and 42 rest at the bottom of inclines 43 and 44 which lead to the valve seats 28 and 29, respectively. The studs 36 and 37 protrude into the chambers 23 and 24 to prevent the balls 41 and 42 from blocking the inlet ducts 30 and 31, which do not appear in FIG. 5. A small central chamber 46 downstream of the valve seats 28 and 29 normally receives fuel from flow paths A and B. From here, the fuel flows out an exit port 47 and through the outlet fitting 11.

To help assure effective seating, the valve seats 26, 27, 28 and 29 preferably have the shape of spherical sections tangent to the adjacent inclined surfaces of the fuel chambers 22, 23 and 24.

In operation of the attitude sensitive fuel valve 18, fuel normally flows from the filter mesh element 17 through the inlet port 25 of the device 18, then is divided in the fluid chamber 22 into two parallel flow paths A and B for flow through the various seats and out the exit port 47 as discussed above. If the automobile is rolled or rotated onto one of its sides, the balls 32 and 41 or 42 roll toward their respective seats. For example, referring to FIGS. 1, 3 and 4, if the automobile is rolled toward the right or clockwise (counter-clockwise as seen in FIG. 4) through an angle L (shown in FIG. 3) greater than that between the normally inclined surface 33 and the horizontal, the ball 32 in the first fluid chamber 22 will be urged by gravity to roll along the surface 33 and seat in the valve seat 26. This will cut off the flow of fuel through the flow path A. At the same time, the ball 42 of the chamber 24, shown in FIG. 5 and in the rolled view of FIG. 3, will roll along the surface 44, which is parallel to the surface 33. The ball 42 will thus be seated in the valve seat 29 to terminate the flow of fuel along flow path B. Since both flow paths have been shut off, the fuel flow through the valving device 18 is terminated. If the vehicle is rolled to the left rather than to the right, opposite surfaces 34 and 43 in valve seats 27 and 28 of the fluid chamber will be involved, again resulting in total stoppage of fuel flow through the device 18.

Should the automobile continue to roll over in either direction, upstream fluid pressure will tend to retain the balls on the seats, even when the vehicle is totally inverted. However, this feature generally need not be depended upon since at this point the carburetor needle valve will have been closed as a result of inversion of the floats in the float chamber (not shown).

In this embodiment, the inclined surfaces 33, 34, 43 and 44 of the fluid chambers 22, 23, and 24, best seen in FIGS. 4 and 5, are matched by symmetrically opposed upper inclined surfaces 51, 52, 53 and 54. This symmetry aids in installation of the device 18 by allowing it to be positioned in the filter 10 and in the automobile as shown in the drawing figures or in a position of 180° rotation from that shown. Since the fuel valve 18 must be rather closely rotationally oriented in the automobile and the fitting through which it is connected to the carburetor 12 generally involves a threaded connection, the choice between two opposed positions of orientation greatly aids installation.

An effective angle for all of the inclined surfaces with the horizontal is between about 35° and 60°, but the angle is preferably held at about 45°. It has been found that at this angle, fuel flow will be shut off in any case where the automobile is tipped to the extent that rolling onto its side is imminent. On the other hand, the angle is sufficiently steep to prevent the device's activation under circumstances where roll is not involved. For example, a hard turn or skid of the automobile would have to be severe enough to produce forces over one G in order to cause the balls to roll upward into the seats and terminate fuel flow. Side forces of this magnitude are generally not incurred in an automobile except under accident conditions.

Although the attitude sensitive fuel valve 18 shown in this embodiment is incorporated within a fuel filter 10, the device 18 may alternatively be connected in a fuel line independently and in series with an in-line fuel filter. It may be placed anywhere in a fuel line where its roll axis can be aligned longitudinally within the automobile. Moreover, the fuel valve 18 is not limited to automotive or fuel applications but may be incorporated in any fluid flow line wherein changes in attitude make desirable the termination of fluid flow. These and other modifications to the preferred embodiment may be made without departing from the spirit and scope of the invention.

I claim:

1. An attitude sensitive valve, comprising:
   a housing defining an upstream inlet fitting and a downstream outlet fitting and having a roll axis;
   a first fluid chamber within said housing, said chamber including a first ball and a pair of seats, each effective to receive the ball in response to rotation about a roll axis of the housing and cut off the flow of fluid through the seat;
   secondary fluid chambers within said housing, each communicating with the first fluid chamber through a fluid passageway leading to one of the first fluid chamber seats, each secondary chamber having an outwardly disposed ball and an inwardly disposed seat, each of said seats being effective to receive one of said balls to stop the flow of fuel therethrough in response to rotation about the roll axis of the housing; and
   a joint flow passage connecting each of said seats in said secondary fluid chambers with the downstream outlet fitting of the housing.

2. The attitude sensitive valve of claim 1 wherein said first fluid chamber includes a pair of contiguous outwardly-inclined surfaces for said first ball, said surfaces each leading to one of said outwardly positioned seats, and wherein said secondary fluid chambers include inwardly inclined surfaces for said secondary chamber balls, each of said inwardly inclined surfaces leading to one of said secondary chamber seats.

3. The attitude sensitive valve of claim 2 wherein each of said balls, when seated, remains substantially on its respective inclined surface.

4. The attitude sensitive valve of claim 2 wherein each of said inclined surfaces, in the normal operating position of the valve, defines an angle of about 45° with the horizontal.

5. A roll responsive fluid valve, comprising, a housing defining a pair of parallel fluid flow passages and having a roll axis, upstream and downstream valve seats positioned within each of said passages, a ball within said housing adjacent each valve seat of each of said flow passages, the ball adjacent the upstream seat of one passage being movable into said upstream seat in response to roll of the fluid valve about the roll axis in one direction, and the ball adjacent the downstream seat of the other passage being movable into the corresponding downstream seat in response to roll in the same direction, whereby fluid flow through both of said parallel flow passages is shut off in response to roll about the roll axis in one direction.

6. The roll responsive valve of claim 5 wherein said housing includes inclined generally planar surfaces parallel to said roll axis, one of said surfaces extending downward from each of said seats in the normal position of the fluid valve, each of said surfaces supporting one of said balls, with the inclined surface of the upstream seat in the one passage being parallel to the inclined surface of the downstream seat in the other passage.

* * * * *

UNITED STATES PATENT OFFICE
CERTIFICATE OF CORRECTION

Patent No. 3,910,301  Dated October 7, 1975

Inventor(s) Ralph L. Kuss

It is certified that error appears in the above-identified patent and that said Letters Patent are hereby corrected as shown below:

In the heading of the patent, the Assignee information should be corrected to read:  --R. L. Kuss & Co., Inc.--.

Signed and Sealed this twenty-seventh Day of January 1976

[SEAL]

Attest:

RUTH C. MASON
*Attesting Officer*

C. MARSHALL DANN
*Commissioner of Patents and Trademarks*